United States Patent
Wood et al.

(10) Patent No.: US 6,485,186 B2
(45) Date of Patent: Nov. 26, 2002

(54) SPLIT BEARING RING AND METHOD FOR MANUFACTURING SAME

(75) Inventors: Eric A. Wood, Greenville; Samuel O. Ricard, Laurens, both of SC (US)

(73) Assignee: The Torrington Company, Torrington, CT (US)

( * ) Notice: Subject to any disclaimer, the term of this patent is extended or adjusted under 35 U.S.C. 154(b) by 27 days.

(21) Appl. No.: 09/727,804

(22) Filed: Dec. 1, 2000

(65) Prior Publication Data

US 2002/0067873 A1 Jun. 6, 2002

(51) Int. Cl.[7] .............................................. F16C 33/60
(52) U.S. Cl. ............................ 384/499; 29/418; 29/423; 29/463; 29/898.066
(58) Field of Search ................................. 384/499, 500, 384/501, 502, 503, 505, 506; 29/898.066, 418, 423, 463

(56) References Cited

U.S. PATENT DOCUMENTS

| | | | |
|---|---|---|---|
| 967,821 A | * 8/1910 | Hess | 235/63 E |
| 1,715,268 A | 5/1929 | Ayers, Jr. | |
| 3,166,827 A | 1/1965 | Bushi | 29/148.4 |
| 3,262,185 A | 7/1966 | Hornigold | 29/148.4 |
| 3,522,644 A | 8/1970 | Cavagnero | 29/148.4 |
| 3,546,762 A | 12/1970 | Martin | 29/148.4 |
| 3,597,819 A | 8/1971 | Scheifele | 29/148.4 R |
| 3,613,106 A | 10/1971 | Cavagnero | 219/105 |
| 3,613,107 A | 10/1971 | Cavagnero | 219/105 |
| 3,619,547 A | 11/1971 | Cavagnero | 219/104 |
| 3,619,548 A | 11/1971 | Cavagnero | 219/105 |
| 4,540,294 A | 9/1985 | Lamperski et al. | 384/273 |
| 4,688,953 A | 8/1987 | Koch et al. | 384/615 |
| 5,102,241 A | 4/1992 | Pflungner | 384/499 |
| 5,528,706 A | 6/1996 | Harimoto | |

FOREIGN PATENT DOCUMENTS

| | | |
|---|---|---|
| GB | 1001988 | 8/1965 |
| GB | 1092667 | 11/1967 |
| GB | 2 115 501 | 9/1983 |
| JP | 55-65724 | 5/1980 |

* cited by examiner

Primary Examiner—Christopher P. Schwartz
Assistant Examiner—C. T. Bartz
(74) Attorney, Agent, or Firm—John C. Bigler; Glenn M. Massina

(57) ABSTRACT

A strip of metal is wrapped into a ring configuration such that ends of the strip are positioned in a predetermined relationship to each other. The ends of the strip are attached together by a temporary weld joining the two ends of the strip, thereby forming a temporary continuous ring. After heat treating the temporary continuous ring, the ring is separated at the temporary weld to provide a heat treated split bearing ring with a controlled clearance at the split.

6 Claims, 2 Drawing Sheets

SPLIT BEARING RING AND METHOD FOR MANUFACTURING SAME

BACKGROUND OF THE INVENTION

This invention relates generally to split bearing rings that provide bearing raceways in zero clearance roller bearings and, more particularly, to a method for manufacturing such split bearing rings.

A common type of zero clearance roller bearings employs an outer bearing ring that is split and forced radially inwardly against the rollers. Typically, such split bearing rings must be hardened and stress relieved after forming so that they can adequately support the rollers. A common problem with these split bearing rings is that irregularities occur at the split due to warping and shrinking during the heat treating. As a result, the bearings may not run as smoothly as desired and premature wear of the rollers may occur.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a partially manufactured split bearing ring comprising a strip of metal wrapped into a ring configuration such that ends of the strip are positioned in a predetermined relationship to each other. The ends of the strip are attached together by at least one temporary weld joining the two ends of the strip, thereby forming a temporary continuous ring suitable for subsequent manufacturing steps to form a completed split bearing ring that is split at the temporary weld.

In another aspect of the invention, this is accomplished by providing a method of manufacturing a split bearing ring. The method comprises wrapping a strip of metal into a ring configuration such that ends of the strip are positioned in a predetermined relationship to each other, attaching the ends of the strip together by at least one temporary weld joining the two ends of the strip, thereby forming a temporary continuous ring, heat treating the temporary continuous ring, and separating the ends of the temporary continuous ring at the at least one temporary weld to provide a heat treated split bearing ring with a controlled clearance at a split of the split ring.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
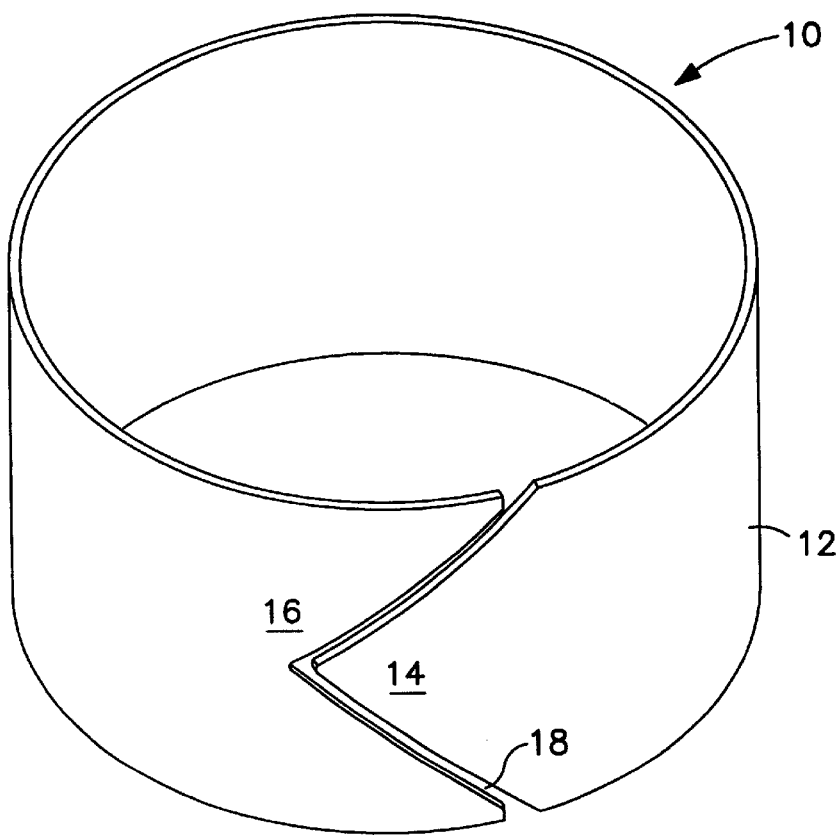
FIG. 1 is a pictorial view of a partially manufactured split bearing ring illustrating the present invention.
Figure 2:
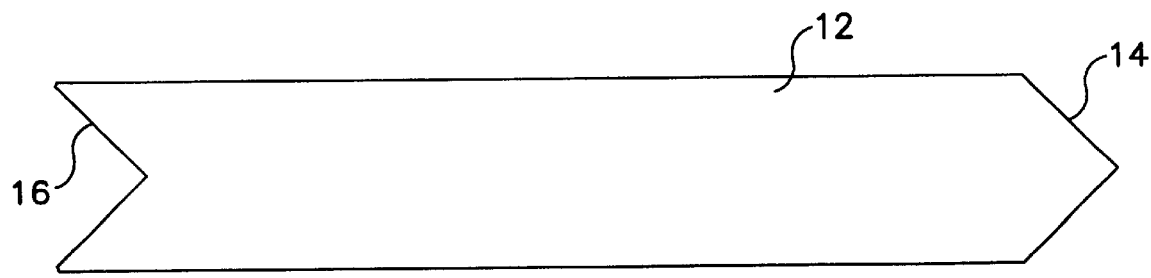
FIG. 2 is a plan view of a strip of metal used to form the partially manufactured split bearing ring of FIG. 1.
Figure 3:
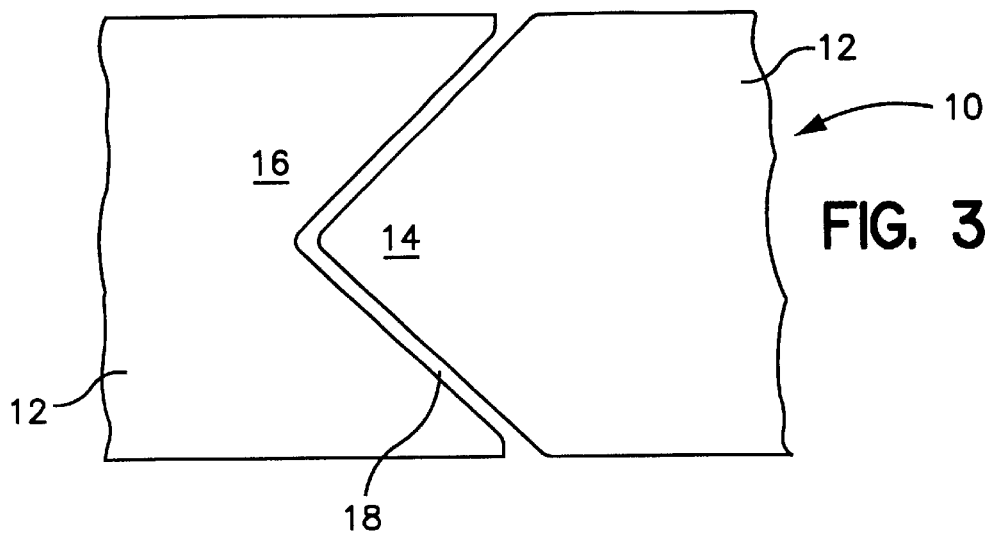
FIG. 3 is an enlarged view, in the radial direction, of a portion of the partially manufactured split bearing ring of FIG. 1.

Referring now to the drawings, FIG. 1 shows a partially manufactured split bearing ring 10 according to the present invention. The ring 10 is formed by wrapping a strip of metal 12, shown in FIG. 2, into a ring configuration such that ends 14 and 16 of the strip of metal 12 are positioned in a predetermined relationship to each other. In the embodiment illustrated in FIG. 1, that predetermined relationship is a uniform positive clearance 18, i.e., a gap, formed between male and female V-shaped ends, respectively, ends 14 and 16.

The chevron shaped split illustrated in FIG. 1 is useful in providing a smooth transition for rollers rolling across the split; however, other shapes for the ends are known for use in zero clearance bearings and may be used. Similarly, the clearance 18 may be zero or even negative, i.e., the ends may be tight together or even overlapping. The amount of clearance can be preselected to provide a desired biasing of the resulting split bearing ring against the rollers and depends upon the material of the strip of metal 12 and the subsequent heat treating, if required, and upon various known design choices.

Figure 4:
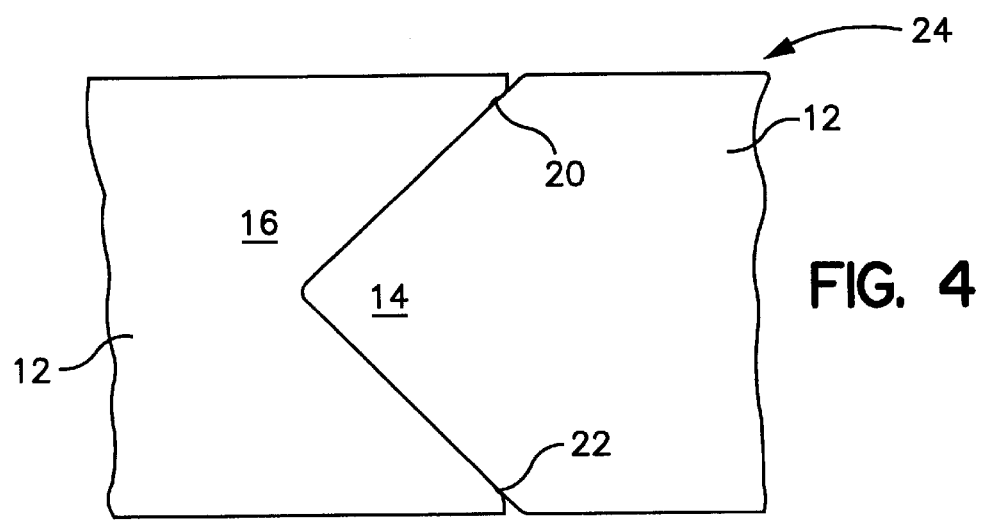
FIGS. 4 and 5 are views similar to FIG. 3 showing subsequent steps for manufacturing a split bearing ring according to the present invention.

As illustrated in FIG. 4, the ends 14 and 16 have been butted together, reducing the clearance 18 to approximately zero, and have been attached together by two small welds 20 and 22, thereby joining the ends of the strip 12 and forming a temporary continuous ring 24. Although two welds are shown, located at the axial ends of the clearance 18, one weld or any number of welds may be used. Various welding techniques may be used; for example, but not limited to, electrical resistance welding and laser welding.

Figure 5:
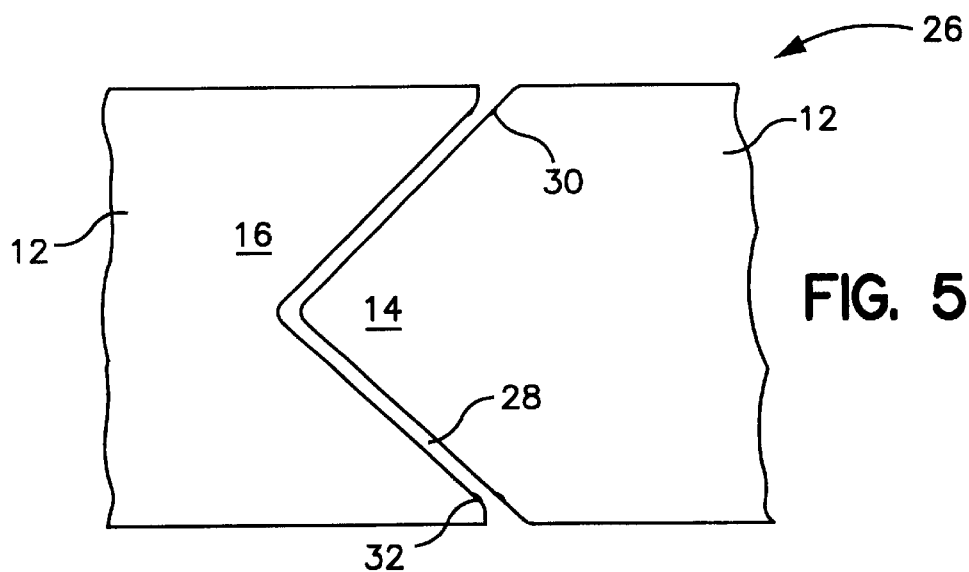

The welds 20 and 22 stabilize the temporary continuous ring 24 during heat treatment processes, if required, generally, hardening and stress relieving. The stability created by the welds is also useful during other manufacturing processes that may be required. After such processes, the ends 14 and 16 are separated at the welds 20 and 22, as shown in FIG. 5, to provide a completed split bearing ring 26 with a controlled clearance 28 at the split. The ends 14 and 16 may be separated by cutting or breaking the welds 20 and 22 by various known methods.

When the ring is deformed within the elastic limit of the material, it will return to the manufactured dimensions when the applied forces are removed. The present invention provides a consistent gap in a split bearing ring suitable for a zero clearance bearing. As a result of the consistent gap, the rollers have a smoother rolling surface and bearing performance is substantially improved.

Having described the invention, what is claimed is:

1. A method of manufacturing a split bearing ring, the method comprising:

wrapping a strip of metal having first and second ends into a ring configuration such that the first and second ends of the strip are positioned in a predetermined relationship to each other;

attaching the first and second ends of the strip together by at least one temporary weld joining the two ends of the strip, thereby forming a temporary continuous ring with the first and second ends having a predetermined clearance therebetween;

heat treating the temporary continuous ring; and detaching the first and second ends of the temporary continuous ring at the at least one temporary weld to provide a heat treated split bearing ring with a controlled clearance at a split of the split ring equal to the predetermined clearance.

2. The method according to claim 1, wherein the ends of the strip form a chevron shape, that is, the strip has male and female V-shaped ends that are positioned adjacent each other.

3. The method according to claim 1, wherein the controlled clearance at the split of the split ring is positive, thereby defining a gap.

4. The method according to claim 1, wherein the number of temporary welds is two, one at each axial end of the temporary continuous ring.

5. The method according to claim 1, wherein the predetermined relationship of the ends of the strip, before welding, is that of zero clearance, the ends being butted together, and wherein the at least one temporary weld is a butt weld.

6. The method according to claim 1, wherein the heat treating comprises hardening the temporary continuous ring and subsequently stress relieving the temporary continuous ring.

* * * * *